United States Patent
Worden et al.

(10) Patent No.: US 9,046,050 B2
(45) Date of Patent: Jun. 2, 2015

(54) SHAFT IMBALANCE DETECTION SYSTEM

(75) Inventors: Bret Dwayne Worden, Erie, PA (US); Matthew John Malone, Lawrence Park, PA (US); Milan Karunaratne, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 888 days.

(21) Appl. No.: 13/233,787

(22) Filed: Sep. 15, 2011

(65) Prior Publication Data

US 2013/0067911 A1     Mar. 21, 2013

(51) Int. Cl.
| | |
|---|---|
| *G01M 1/16* | (2006.01) |
| *F02D 41/00* | (2006.01) |
| *G01M 1/24* | (2006.01) |
| *F02D 41/14* | (2006.01) |
| *G01M 15/04* | (2006.01) |
| *F02B 39/16* | (2006.01) |
| *F02D 41/28* | (2006.01) |

(52) U.S. Cl.
CPC ........ *F02D 41/0085* (2013.01); *F02D 41/0097* (2013.01); *F02D 41/1498* (2013.01); *G01M 15/046* (2013.01); *F02B 2039/168* (2013.01); *F02D 2041/288* (2013.01); *F02D 2200/1012* (2013.01); *G01M 1/24* (2013.01)

(58) Field of Classification Search
CPC ................... F02B 2039/168; F02D 2041/288; F02D 2200/1012; F02D 41/0085; F02D 41/0097; G01M 1/24; G01M 15/046
USPC ....................... 73/460, 462; 60/598
See application file for complete search history.

(56) References Cited

U.S. PATENT DOCUMENTS

| | | | | |
|---|---|---|---|---|
| 4,334,427 A | | 6/1982 | Armstrong | |
| 4,439,728 A | * | 3/1984 | Rickman, Jr. ................. | 324/164 |
| 4,520,674 A | * | 6/1985 | Canada et al. .................. | 73/660 |
| 4,523,482 A | * | 6/1985 | Barkhoudarian ........ | 73/862.336 |
| 4,700,117 A | * | 10/1987 | Giebeler et al. .............. | 388/814 |
| 4,953,110 A | * | 8/1990 | Chartrand ..................... | 701/101 |
| 5,216,915 A | | 6/1993 | Sakamoto | |
| 5,336,996 A | * | 8/1994 | Rusnak ...................... | 324/207.2 |
| 5,385,129 A | * | 1/1995 | Eyberg .......................... | 123/436 |
| 5,408,225 A | * | 4/1995 | Stadelhofer ................ | 340/686.2 |
| 5,508,609 A | * | 4/1996 | Parkinson et al. ....... | 324/207.25 |
| 5,711,272 A | | 1/1998 | Maegawa et al. | |

(Continued)

FOREIGN PATENT DOCUMENTS

| | | |
|---|---|---|
| DE | 10134543 A1 | 2/2003 |
| EP | 0522849 A1 | 7/1991 |

(Continued)

OTHER PUBLICATIONS

U.S. Appl. No. 13/047,200, filed Mar. 14, 2011.

(Continued)

*Primary Examiner* — Laura Martin
*Assistant Examiner* — Samir M Shah
(74) *Attorney, Agent, or Firm* — GE Global Patent Operation; John A. Kramer

(57) ABSTRACT

A shaft imbalance detector system (50) includes a speed sensor (52) that detects a speed of a wheel and generates a speed signal, and a controller (60) connected to the speed sensor (52). The controller (60) is configured to monitor the speed signal, where a variation in the speed signal indicates an imbalance in a shaft (22).

16 Claims, 3 Drawing Sheets

(56) References Cited

U.S. PATENT DOCUMENTS

| | | | |
|---|---|---|---|
| 5,728,941 | A | 3/1998 | Yamamoto et al. |
| 5,860,800 | A | 1/1999 | Kramer et al. |
| 6,023,651 | A | 2/2000 | Nakayama et al. |
| 6,163,254 | A * | 12/2000 | Smith et al. ............ 340/439 |
| 6,508,128 | B2 * | 1/2003 | Bode ....................... 73/593 |
| 6,510,731 | B2 | 1/2003 | Schricker et al. |
| 6,658,346 | B2 | 12/2003 | Maegawa |
| 6,711,952 | B2 * | 3/2004 | Leamy et al. ............ 73/579 |
| 6,785,635 | B2 * | 8/2004 | von Flotow ............ 702/184 |
| 6,968,268 | B2 | 11/2005 | Yamada et al. |
| 7,133,766 | B2 | 11/2006 | Kokubo |
| 7,197,916 | B2 | 4/2007 | Matsumoto et al. |
| 7,333,913 | B2 * | 2/2008 | Andarawis et al. ....... 702/158 |
| 7,582,359 | B2 * | 9/2009 | Sabol et al. ............ 428/469 |
| 7,761,223 | B2 | 7/2010 | Wang et al. |
| 8,146,358 | B2 * | 4/2012 | Greentree ............ 60/605.1 |
| 2002/0050271 | A1 | 5/2002 | Hasegawa et al. |
| 2003/0066352 | A1 * | 4/2003 | Leamy et al. ............ 73/593 |
| 2004/0148926 | A1 | 8/2004 | Morinaga et al. |
| 2005/0204805 | A1 | 9/2005 | Wakahara et al. |
| 2006/0005623 | A1 * | 1/2006 | Hildebrand et al. .......... 73/468 |
| 2007/0079613 | A1 * | 4/2007 | Greentree ............ 60/602 |
| 2009/0120174 | A1 | 5/2009 | Nodera et al. |
| 2009/0229355 | A1 | 9/2009 | Shoda |
| 2009/0266073 | A1 * | 10/2009 | Greentree ............ 60/602 |
| 2010/0162797 | A1 | 7/2010 | Summers et al. |
| 2010/0178132 | A1 * | 7/2010 | Ante et al. ............ 411/427 |
| 2010/0211296 | A1 | 8/2010 | Saunders |
| 2010/0292937 | A1 * | 11/2010 | Hosny et al. ............ 702/34 |

FOREIGN PATENT DOCUMENTS

| | | |
|---|---|---|
| EP | 1304463 A1 | 4/2003 |
| FR | 2930037 A1 | 10/2009 |

OTHER PUBLICATIONS

Search Report and Written Opinion from corresponding PCT Application No. PCT/US2012/053506 dated Feb. 11, 2013.

* cited by examiner

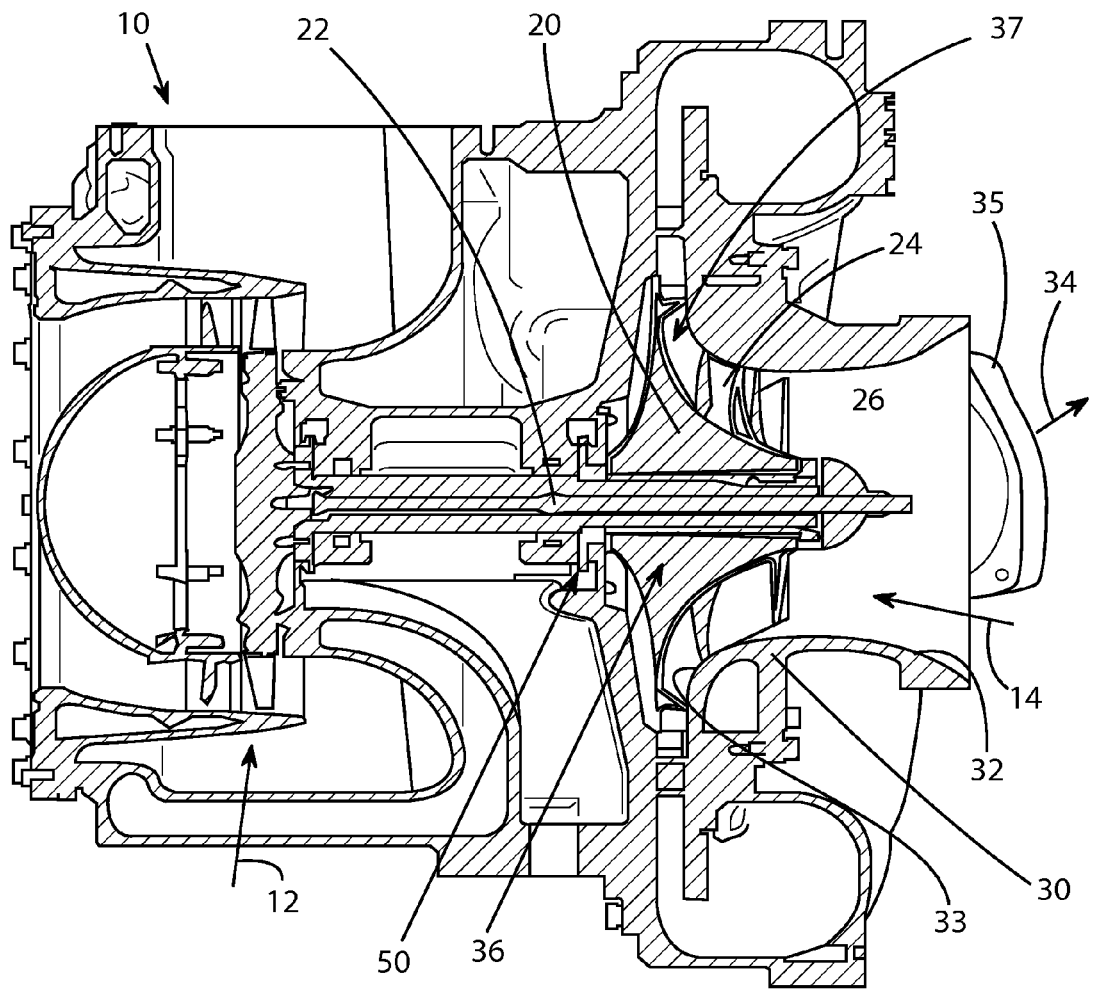
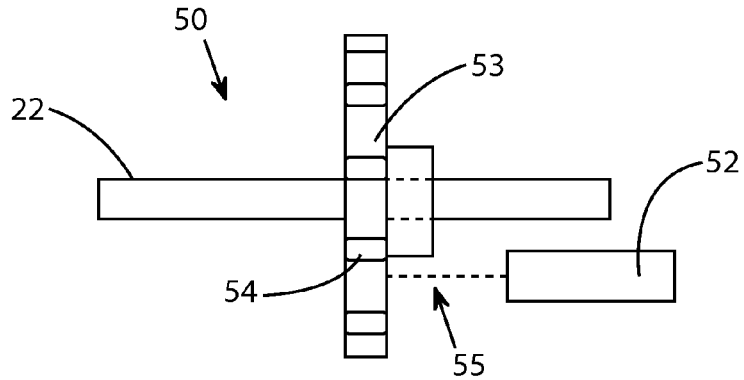

SHAFT IMBALANCE DETECTION SYSTEM

BACKGROUND

1. Technical Field

The invention generally relates to a shaft imbalance detection system for a rotating system.

2. Discussion of Art

Rotating systems include objects that rotate on a shaft including but not limited to fan blades, gears, wheels, such as compressor wheels or drive wheels, among others. Deviation of the shaft or any other imbalance in the shaft resulting from foreign object damage or other causes can lead to costly and time consuming repairs.

It is desirable to detect a shaft imbalance to reduce the scope of damage resulting from an imbalance and to help identify the source of a failure.

BRIEF DESCRIPTION

In an embodiment, a shaft imbalance detector system includes a speed sensor that detects a speed of a compressor wheel and generates a speed signal; and a controller connected to the speed sensor. The controller is configured to monitor the speed signal, wherein a variation in the speed signal indicates an imbalance in the shaft.

In an embodiment, a shaft imbalance detector system for a shaft of a compressor wheel in a turbo charger is provided. The shaft imbalance detector system includes a controller connected to a speed sensor. The speed sensor generates a voltage pulse corresponding to the passage of a tooth on a gear attached to the shaft of the compressor wheel, the pulse having a pulse width corresponding to the time in which the tooth passes the sensor. A change in the pulse width signals the controller to an imbalance.

In another embodiment, a method of detecting a shaft imbalance in a turbo charger having a compressor wheel mounted on a shaft is provided. The method includes providing a gear having at least one tooth on the shaft, where the gear rotates with the shaft; providing a speed sensor aimed at the gear and held in a fixed spaced position relative to the gear defining a detecting field between the sensor and the gear, wherein the speed sensor generates a signal as the tooth of the gear moves through the field; and monitoring the signal for a variation in a characteristic of the signal.

In another embodiment, a vehicle includes an engine connected to a turbo charger; the turbo charger including a shaft; a compressor wheel and a gear mounted on the shaft, wherein the compressor wheel and the gear rotate with the shaft; the gear having at least one tooth; a speed sensor in sensing communication with the gear, wherein an air gap is defined between the gear and the sensor, where the sensor detects the passage of the at least one tooth and generates a signal corresponding to the passage of the at least one tooth, the signal having a signature; and a controller in communication with the sensor and the motor, the controller monitoring the signature of the sensor to detect a variation in the signature.

BRIEF DESCRIPTION OF THE DRAWINGS

Reference is made to the accompanying drawings in which particular embodiments and further benefits of the invention are illustrated as described in more detail in the description below, in which:

FIG. 1 is a schematic cross section of a rotating system according to the invention;

FIG. 2 is an enlarged schematic view of a shaft imbalance detector according to the invention;

DETAILED DESCRIPTION

Embodiments of the subject matter disclosed herein relate to systems and methods for diagnosing a rotating system, such as, a turbo charger. Test kits for performing the methods are provided, also. The turbo charger may be included in a vehicle, such as a locomotive system. Other suitable types of vehicles may include on-highway vehicles, off-highway vehicles, mining equipment, aircraft, and marine vessels. Other embodiments of the invention may be used for stationary engines such as wind turbines or power generators. The engine may be a diesel engine, or may combust another fuel or combination of fuels. Such alternative fuels may include gasoline, kerosene, biodiesel, natural gas, and ethanol—as well as combinations of the foregoing. Suitable engines may use compression ignition and/or spark ignition. These vehicles may include an engine with components that degrade with use.

Embodiments of the invention relate to a system for detecting a condition within a rotating system 10. In one embodiment, the rotating system can include a shaft, a rotating component coupled to the shaft, and a housing that encompasses the rotating component. As used herein, a "wheel" is any rotating component of any shape or dimension including but not limited to a fan blade, a hub, a gear, a compressor wheel, or a drive wheel. A "shaft" is a member that imparts rotation to the wheel, and may have any shape, dimension or cross-section. A "shroud" is any housing that at least partially encompasses the wheel and shaft creating a gap between at least a portion of the wheel and the shroud referred to as a "clearance gap."

Figure 5:
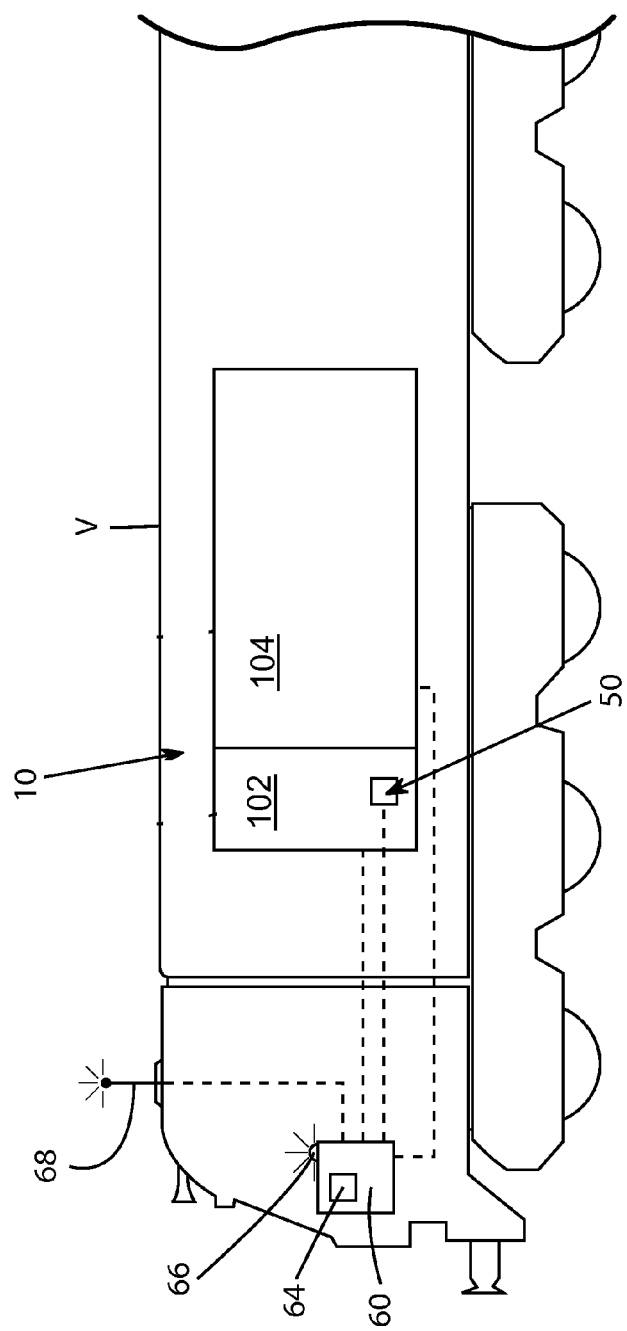
FIG. 5 is a schematic view of a rail vehicle having a controller monitoring a signal from a sensor in a turbo charger.

The rotating system may form part of a power generation system or vehicle including but not limited to locomotives (FIG. 5), mining equipment, marine vessels, passenger vehicles, off highway vehicles. Rotating system 10, therefore, may include a generator or engine connected to the turbo charger 102. FIG. 5 depicts a turbo charger 102 connected to an engine 104 used to power a locomotive vehicle 106.

As shown in FIG. 1, the turbo charger includes a rotatable shaft 22 with a compressor wheel 20 mounted on the shaft 22. The shaft 22 is driven by a drive wheel 15, also referred to as a turbine wheel, connected to the shaft 22, such that, rotation of the drive wheel causes rotation of the shaft. The drive wheel is in fluid communication with a pressurized flow 12, for example, exhaust gas from an engine, a charged air system or pressurized source. One or more blades or vanes on the drive wheel are driven by the pressurized flow and used to drive the shaft and rotate the compressor wheel. The terms blade and vane will be used interchangeably and should not be considered limiting.

The compressor wheel is at least partially housed within a housing or shroud 30 having a compressor inlet 32 through which fluid 14 (indicated by arrow) is drawn and compressed by rotation of the compressor wheel. The pressurized fluid from the compressor wheel exits the shroud at a compressor discharge 35. The pressurized fluid from the compressor wheel is directed from the turbo charger for use in power generation, creation of a motive force, or to boost performance of an engine. In the example shown, compressed air 34 exiting the discharge is directed to an engine 104 for use in combustion.

With reference to FIG. 1, the inner surface 33 of shroud 30 is spaced outward from a the compressor wheel defining a clearance gap 37 between the shroud 30 and the compressor wheel 20. The compressor wheel rotates about a central axis A and scribes an intended path defined by the cross-section 36 of compressor wheel 20, as it rotates. Accordingly, the clearance gap 37 between the shroud and the compressor wheel lies outward of the compressor wheel as it rotates along its intended path. An imbalance in the compressor wheel will cause the compressor wheel to deviate from its intended path and enter the clearance gap between the compressor wheel and the shroud. Any imbalance in the shaft or deviation of the one or more of the wheels from their intended path resulting from a shaft imbalance will be collectively referred to as a condition herein.

These conditions can lead to a turbo charger failure. Turbo charger failure often results in an immediate engine shutdown requiring extensive service/repair before restarting the engine. In some instances, turbo charger conditions lead to damage to downstream components within a turbo machine including, for example, over pressurization of the engine crankcase.

To reduce the likelihood turbo charger failure and engine shutdown, a shaft imbalance detector system 50 is provided. Shaft imbalance detector system 50 detects an imbalance by monitoring a signal from a speed sensor 52. In the embodiment shown, speed sensor is in sensing communication with a gear 53 having at least one tooth 54. For example, the gear shown has eight teeth. The gear 53 is mounted on shaft 22 and located between drive wheel 15 and compressor wheel 20. In the example shown, gear 53 is located slightly inward of the compressor wheel.

Figure 3:
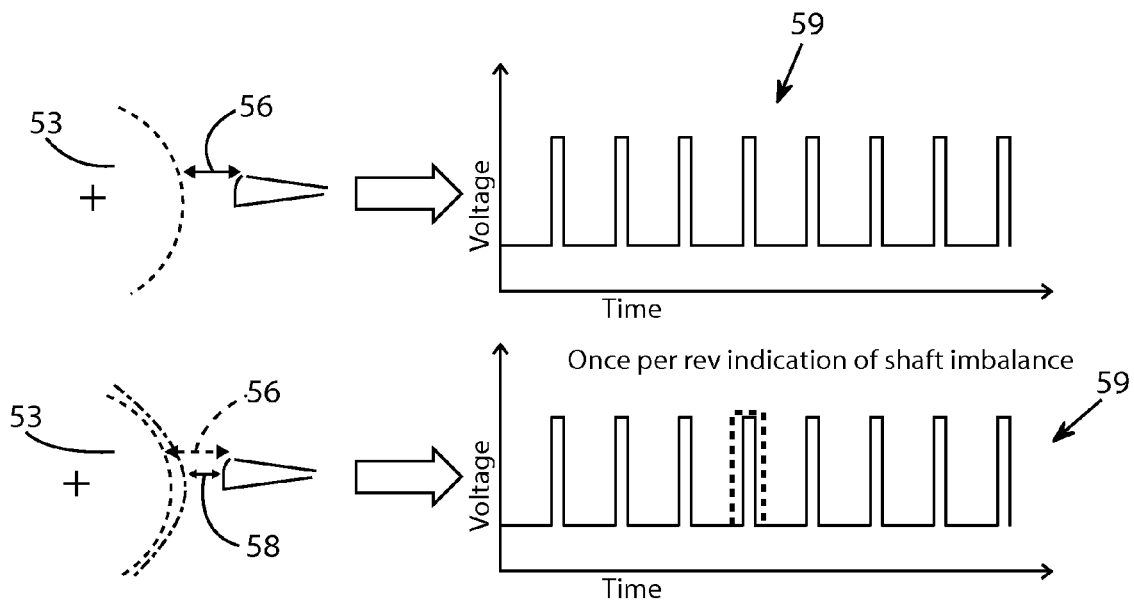
FIG. 3 is a graphical representation of a speed sensor and the signal generated by the speed sensor with an imbalance condition shown in dashed lines.
Figure 4:
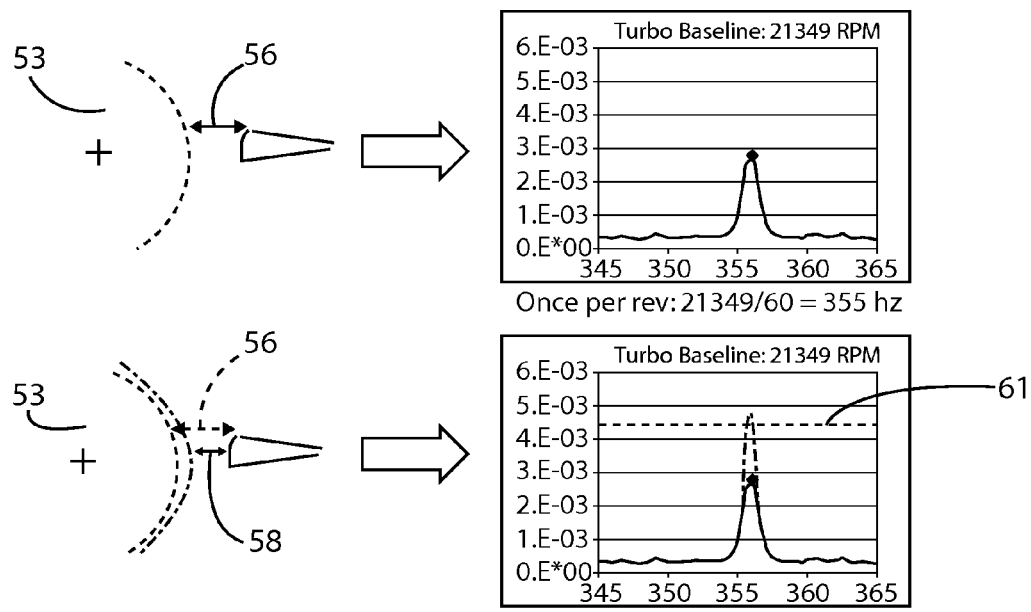
FIG. 4 is a graphical representation of a speed sensor and the signal generated by the speed sensor with an imbalance condition shown in dashed lines.

The speed sensor, shown, is held in a fixed position relative to the gear 53 defining a detecting field 55 forward of the sensor 52. As each tooth passes through the detecting field of the sensor, the sensor generates a signal corresponding to the tooth. Suitable sensors include Hall effect sensors, reluctance sensors, and the like. For example, a Hall effect sensor is used to generate a voltage corresponding to the passage of the tooth. As shown in FIGS. 3 and 4, as the tooth passes the sensor, a voltage pulse is generated. The speed signal over a given period of time forms a signature 59 (FIG. 3). For example, FIG. 3 depicts the speed signature 59 created during one revolution of the gear with the passage of each tooth shown as a voltage pulse.

As shown in FIG. 5, a controller 60 in communication with sensor 52 monitors the signal from the sensor to detect any variations in the signal or its signature tending to indicate an instability in the shaft or another condition. As graphically depicted in FIG. 3, an imbalance in the shaft or other condition will alter rotation of the shaft altering the rotation of gear such that one or more gear teeth are in closer proximity to sensor. In the example shown, a normal gap 56 exists between sensor 52 and a gear tooth 54. When an imbalance occurs, the gap 56 is reduced. The reduced gap depicted in FIG. 4 at 58 with the normal gap 56 shown as a dashed line for comparison. The reduction in the gap alters the signal generated by the sensor. As depicted in FIG. 3, the reduction in the gap increases the width of voltage pulse because the tooth is in the detection field of the sensor 52 for a greater period of time. As shown in FIG. 4, the magnitude of the voltage signal increases as a result of the reduction in the gap between the sensor and the gear tooth.

Controller 60 monitors the sensor's signal for such variations and may take remedial action upon detecting a change in the signal. Controller 60 can monitor the signature of the speed signal in the same fashion over a pre-selected time period. For example, the signature is monitored once per revolution. Monitoring may occur over periods of less than one revolution or greater than one revolution as well.

The controller includes thresholds to determine when remedial action is necessary since some variation in the signal or signature may be permissible. For example, controller includes a voltage signal threshold indicated by the dashed line (61) in FIG. 4 indicating a condition that requires remedial action. If, as shown in FIG. 4, the voltage exceeds this threshold, controller initiates remedial action including but not limited to logging data corresponding to the detection of a signal exceeding the threshold, transmitting data concerning the condition to another device; enunciating an alarm; adjusting the performance of the turbo charger or other related components to compensate for the detected condition; derating the turbo charger or other related components; and shutting down the turbo charger or other related components. Memory 64 is provided to log data from controller 60. Memory 64 may be internal to the controller, as shown, or located remotely from controller 60. Likewise, a communication system 68 is provided to transmit data from controller 60 to remote sources. Communication system 68 is shown mounted on the cab of a locomotive, but may be located in any other suitable location as well.

In one embodiment, communications system may include a radio and an antenna for transmitting and receiving voice and data messages. For example, data communications may be between the vehicle system and a control center of a railroad, another locomotive, a satellite, and/or a wayside device, such as a railroad switch. For example, the controller may estimate geographic coordinates of the vehicle system using signals from a GPS receiver. As another example, the controller may transmit operational characteristics of the engine and/or auxiliary equipment to the control center via a message transmitted from communications system. In one embodiment, a message may be transmitted to the command center by communications system when a degraded component of the engine or auxiliary equipment is detected and the vehicle system may be scheduled for maintenance.

A request to schedule service may be sent, such as by a message sent via communications system, for example. Further, by sending the potential fault condition and the severity of the potential fault, down-time of vehicle 106 may be reduced. For example, service may be deferred on vehicle 106 when the potential fault is of low severity. Down-time may be further reduced by derating power of the engine, such as by adjusting an engine operating parameter based on the diagnosed condition. It may be determined if derating of the engine is enabled. For example, derating the power of the engine may reduce the magnitude of one or more components of the frequency content of the generator data.

The data logged or transmitted by controller 60 includes at least one of the operating speed of the engine or generator to which the turbo charger is connected, power output level, and operating temperature of the turbo charger. Other information collected by the controller or other vehicle systems may also be logged in memory or transmitted as desired. The data logging feature is useful as a diagnostic tool and during operation to warn an operator of a condition that would affect performance of the turbo charger or any associated components. Depending on the signal received from the speed sensor, controller enunciates an alarm, for example, by activating a warning indicator 66 that alerts the operator to the detected condition. The warning indicator produces an audible, visual, or tactile indicator including for example, a warning light, siren, or buzzer. The warning indicator may include progressive warnings that increase in intensity or other variation in color, frequency, to indicate worsening of the condition. Alternatively, if the operator does not take action in a selected time after the warning is issued, controller may initiate further remedial action to avoid worsening of the condition or operate the turbo machine in a fail safe mode.

For example, in a locomotive vehicle (FIG. 5), if the gear deviates from its intended path, the speed sensor would detect a change in the speed signal indicating an imbalance in the shaft. This imbalance could be the result of a bearing going bad or foreign object damage within the turbo charger. To avoid a worsening condition, upon receiving a signal from the shaft imbalance detector, the turbo machine system can derate power to the turbo charger reducing the turbo speed. This will allow the locomotive to make its own power at the derated threshold allowing it to continue to operate albeit at a slower speed to reach a service shop. To that end, as shown in FIG. 4, controller 60 in a locomotive communicates with the engine E and the turbo charger 102.

In another embodiment a shaft imbalance detector system includes a speed sensor that detects a speed of the compressor wheel and generates a speed signal. The system further includes a controller connected to the speed sensor configured to monitor the speed signal. A variation in the speed signal indicates an imbalance in the shaft. The controller detects variations in a frequency of the speed signal, spacial frequency content, time frequency content, among others. In one embodiment, the speed sensor is in sensing communication with a gear mounted on a shaft of a compressor wheel. The gear has at least one tooth, where the speed sensor generates a pulse corresponding to the passage of the tooth. In one embodiment, the speed sensor is a Hall effect sensor. The controller detects a variation in the magnitude or width of the pulse to signal an imbalance in the shaft. Upon detecting a variation in the speed signal, the controller initiates a remedial action. The remedial action includes at least one of the following: the controller logging data relating to the detected variation in a memory 64, derating the turbo charger, reducing the speed of the turbo charger, derating the horse power of an engine connected to the turbo charger, shutdown the turbo charger, shutdown the engine, compensate for the variation, such as initiating cylinder balancing in the engine. The imbalance detection system alternatively includes a warning indicator 66, and the remedial action includes activating the warning indicator. Other remedial action includes transmitting data from the detector via a communication system 68 in communication with the controller.

In an embodiment, the speed sensor is located a fixed distance from a gear having at least one tooth, and the speed signal is a pulse corresponding to the passage of the tooth past the speed sensor. The controller monitors the pulse and upon detecting an increase in a magnitude or pulse width of the pulse beyond a threshold value, the controller identifies this as a reduction in the gap between the sensor and the gear tooth. Upon detecting the reduction in the gap between the speed sensor and the gear tooth, the controller initiates a remedial action. In another embodiment, the shaft imbalance detector includes a display connected to the controller to show the speed signal over a selected period of time.

In another embodiment, a shaft imbalance detector system for a shaft of a compressor wheel in a turbo charger includes a controller connected to a speed sensor, the speed sensor generating a voltage pulse corresponding to the passage of a tooth on a gear attached to the shaft of the compressor wheel. The pulse has a pulse width corresponding to the time in which the tooth passes the sensor, where a change in the pulse width signals the controller to an imbalance. In an embodiment, the controller is connected to the turbo charger and derates the turbo charger upon detecting a change in the pulse width. Alternatively, the controller is connected to a locomotive engine and derates the locomotive engine upon detecting a change in the pulse width.

In still another embodiment, a method of detecting a shaft imbalance in a turbo charger having a compressor wheel mounted on a shaft is provided. The method includes providing a gear having at least one tooth on the shaft, where the gear rotates with the shaft. The method further includes providing a speed sensor aimed at the gear and held in a fixed spaced position relative to the gear defining a detecting field between the sensor and the gear, where the speed sensor generates a signal as the tooth of the gear moves through the detecting field. The method also includes monitoring the signal for a variation in the characteristic of the signal.

In an embodiment, the speed sensor used in the method generates a pulse corresponding to the passage of the gear tooth through the detecting field, where the step of monitoring includes detecting an increase in the magnitude or width of the pulse. Upon detecting a pulse having a magnitude greater than a pre-selected limit, the method includes derating the turbo charger. In an embodiment, the step of monitoring is performed once per revolution of the shaft. Upon detecting a variation in the speed signal, remedial action is initiated. The step of initiating a remedial action includes performing at least one of logging any variation in the speed signal, transmitting information relating to the variation in the speed signal, enunciating a warning, compensating for the variation in the speed signal, and derating the turbo charger. The step of logging includes storing the time and speed at which the variation in the speed signal occurred.

Another embodiment includes a vehicle including an engine connected to a turbo charger. The turbo charger includes a shaft, a compressor wheel and a gear mounted on the shaft, where the compressor wheel and the gear rotate with the shaft. The gear has at least one tooth. The vehicle also includes a speed sensor in sensing communication with the gear, where an air gap is defined between the gear and the sensor. The sensor detects the passage of the at least one tooth and generates a signal corresponding to the passage of the at least one tooth. The signal has a signature. The vehicle also includes a controller in communication with the sensor and the engine. The controller monitoring the signature of the sensor to detect a variation in the signature of the speed signal. Upon detecting a variation in the signature of the speed signal, the controller initiates a remedial action including at least one of logging the variation in the speed signal, transmitting information relating to the variation in the speed signal, enunciating a warning, compensating for the variation in the speed signal, derating the turbo charger, reducing horsepower produced by the engine, and shutting down at least one of the turbo charger and engine.

In one embodiment, a test kit is provided. The test kit includes a controller that is operable to determine a condition of an engine based on frequency content of a torque profile derived from parameter measurements of a turbo charger operatively connected to the engine.

In one embodiment, a method for an engine operatively connected to a turbo charger is provided. The method includes measuring an electrical parameter associated with the turbo charger during operation and diagnosing a condition of the engine based on frequency content of the measured electrical parameter.

In one embodiment, a vehicle system is provided. The vehicle system includes an engine, a turbo charger operatively connected to the engine, a sensor for measuring an electrical parameter associated with the turbo charger during operation, and a controller. The controller includes instructions configured to sample the measured electrical parameter, identify frequency content of the measured electrical parameter, and diagnose a condition of the engine based on the frequency content of the measured electrical parameter.

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occurred to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A shaft imbalance detector system comprising:
   a diagnostic gear having at least one gear tooth, the diagnostic gear attached about a rotating shaft and contained within a turbo charger, super-charger, or any engine aspiration compressor through which at least a portion of the shaft passes;
   a speed sensor that is configured to detect a speed of the shaft and generate a pulse based on passage of the at least one gear tooth of the diagnostic gear, the pulse comprising at least a portion of a speed signature; and
   a controller connected to the speed sensor configured to monitor the speed signature, wherein a variation in the speed signature indicates an imbalance in the shaft.

2. The shaft imbalance detector system of claim 1, wherein the controller is configured to detect variations in a frequency of the speed signature.

3. The shaft imbalance detector system of claim 1, wherein the controller is configured to detect spatial frequency content within the speed signature.

4. The shaft imbalance detector system of claim 3, wherein the controller is configured to detect the spatial frequency content at least once per revolution.

5. The shaft imbalance detector system of claim 1, wherein the controller is configured to detect time frequency content within the speed signature.

6. The shaft imbalance detector system of claim 1, wherein the speed sensor is a hall effect sensor.

7. The shaft imbalance detector system of claim 1, wherein the controller is configured to detect a variation in a magnitude or a width of the pulse to detect an imbalance in the shaft.

8. The shaft imbalance detector system of claim 1, wherein upon the variation in the speed signature, the controller is configured to initiate a remedial action.

9. The shaft imbalance detector system of claim 8, wherein the remedial action includes at least one of
   derating the turbo charger, super-charger, or any engine aspiration compressor,
   reducing a speed of the turbo charger, super-charger, or any engine aspiration compressor,
   derating a horsepower of the engine,
   shutdown of the turbo charger, super-charger, or any engine aspiration compressor, and
   shutdown of the engine.

10. The shaft imbalance detector system of claim 8, wherein the remedial action includes compensating for the variation.

11. The shaft imbalance detector system of claim 10, wherein the compensating includes the controller initiating a cylinder balancing operation within an engine operably connected to the shaft.

12. The shaft imbalance detector system of claim 8 further comprising a warning indicator, wherein the remedial action includes activating the warning indicator.

13. The shaft imbalance detector system of claim 8 further comprising a communication system in communication with the controller, wherein the remedial action includes transmitting data from the shaft imbalance detector system.

14. The shaft imbalance detector system of claim 1, wherein the speed sensor is located a fixed distance from the diagnostic gear.

15. The shaft imbalance detector system of claim 14, wherein the controller is configured to monitor the pulse and upon detecting an increase in a magnitude or pulse width of the pulse beyond a threshold value, the controller is configured to identify this as a potential reduction in a gap between the speed sensor and the at least one gear tooth.

16. The shaft imbalance detector system of claim 15, wherein upon the controller detecting the reduction in the gap between the speed sensor and the at least one gear tooth, the controller is configured to initiate remedial action.

* * * * *